Figure 2:
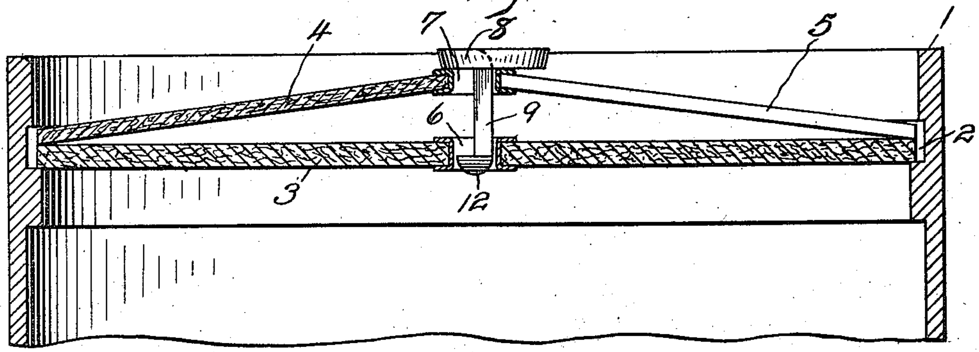

A. J. HODGE & H. B. RUGGLES.
BARREL HEAD SEAL.
APPLICATION FILED AUG. 7, 1915.
1,268,461.
Patented June 4, 1918.
2 SHEETS—SHEET 1.
Fig. 1.
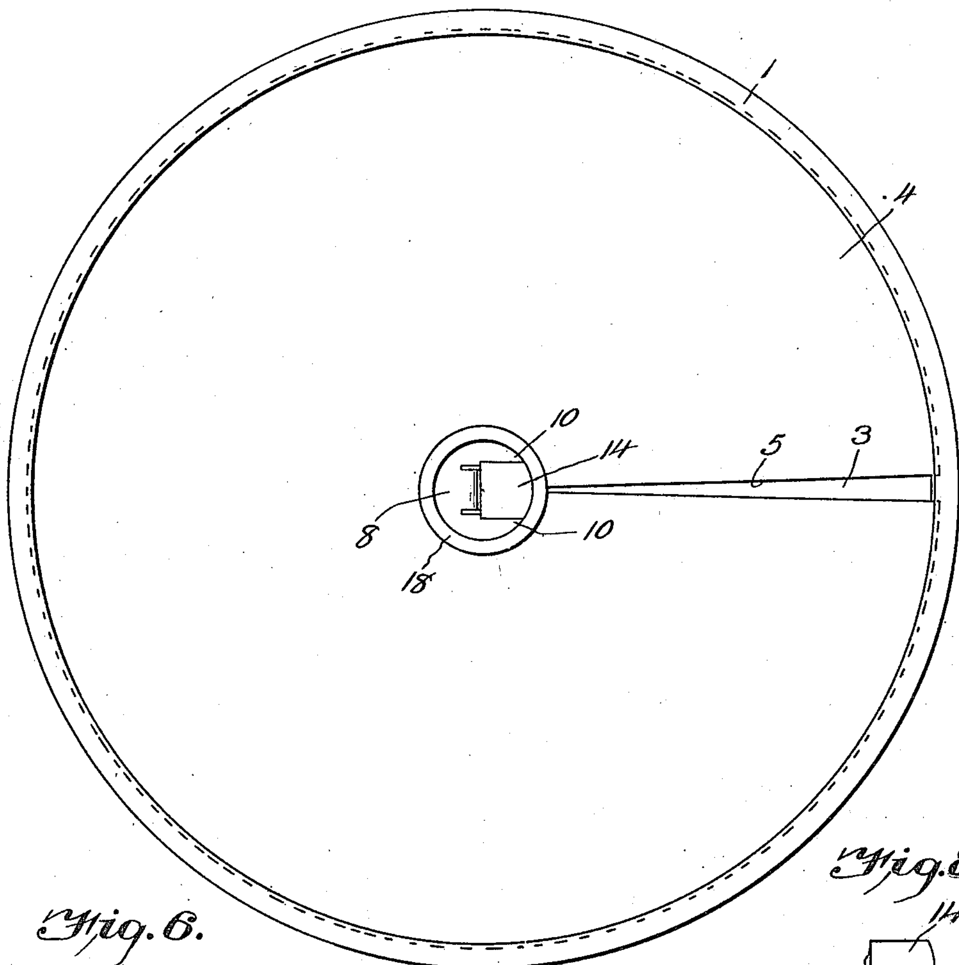
Fig. 8.
Fig. 6.
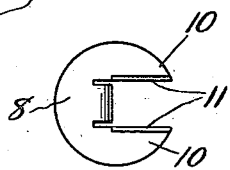
Fig. 5.
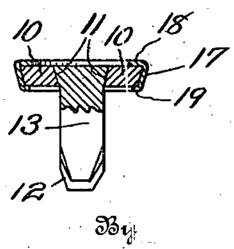
Fig. 9.
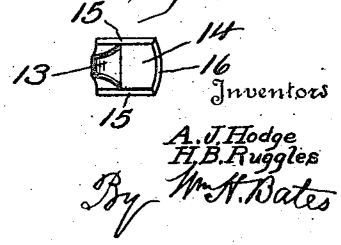
Fig. 7.
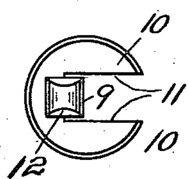
Inventors
A. J. Hodge
H. B. Ruggles
By Wm. H. Bates
Attorney

A. J. HODGE & H. B. RUGGLES.
BARREL HEAD SEAL.
APPLICATION FILED AUG. 7, 1915.

1,268,461.

Patented June 4, 1918.
2 SHEETS—SHEET 2.

Inventor
A. J. Hodge
H. B. Ruggles

By Wm N. Bates

Attorney

UNITED STATES PATENT OFFICE.

ARTHUR J. HODGE AND HENRY B. RUGGLES, OF PASADENA, CALIFORNIA, ASSIGNORS TO AMERICAN PRODUCTS COMPANY, OF ST. LOUIS, MISSOURI.

BARREL-HEAD SEAL.

1,268,461. Specification of Letters Patent. Patented June 4, 1918.

Application filed August 7, 1915. Serial No. 44,237.

*To all whom it may concern:*

Be it known that we, ARTHUR J. HODGE and HENRY B. RUGGLES, citizens of the United States, residing at Pasadena, in the county of Los Angeles and State of California, have invented certain new and useful Improvements in Barrel-Head Seals, of which the following is a specification.

This invention has relation to certain new and useful improvements in barrel head seals and fasteners, and has for its primary object, the provision of a barrel head seal of the form shown in our co-pending application, Serial No. 44,454, filed Aug. 9, 1915, and which will be an improvement over the same and especially adapted for securing and sealing in position barrel heads of the type shown in our co-pending applications, Serial Nos. 21,432, filed April 14, 1915, and 24,077, filed April 26, 1915.

The invention has for another object, the provision of a seal and fastener which will be constructed in such manner that when being placed in position, it will serve when pressed upon to draw together and expand radially spaced barrel head members to tighten the same within the croze of a receptacle, such as a barrel.

The invention has for another object, the provision of an improved form of barrel head seal and fastener of this character, which may be readily and securely fastened in position to seal within a receptacle the head with which the seal is engaged.

The invention has for a further object, the provision of a barrel head seal and fastener of the above stated character, which will be of extremely simple construction, composed of the minimum number of parts, and in which a sealing ring may be employed and clamped around the beveled edges of the main and auxiliary seal members to prevent independent movement of the same or withdrawal of the seal from the barrel head to permit removal of the latter, without destruction of the sealing ring.

The invention has for a still further object, the provision of a barrel head seal and fastener of this character which will be constructed in such manner that the sealing ring may be readily clamped around the body or main portions of the main and auxiliary seal members by a suitable tool provided for this purpose, after said main and auxiliary seal members have been secured in position.

With these and other objects in view, the invention consists in the novel construction, combination and arrangement of parts as will be hereinafter more in detail described, and the asserted novelty specifically pointed out in the claims.

In the accompanying drawings, which clearly and fully illustrate the invention:—

Figure 3:
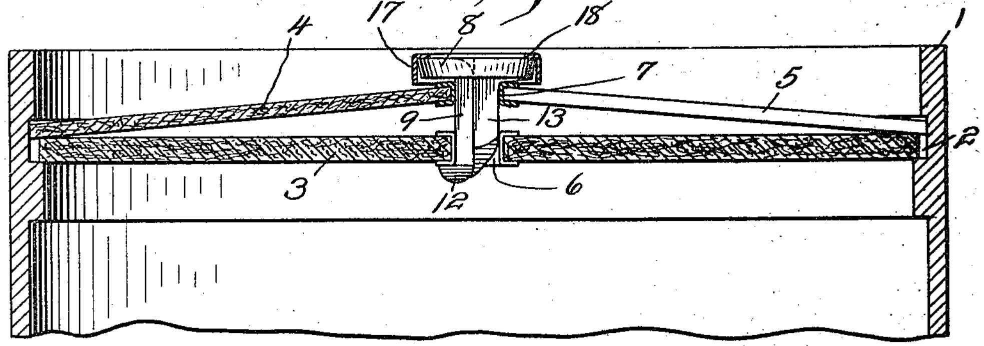
Figure 4:
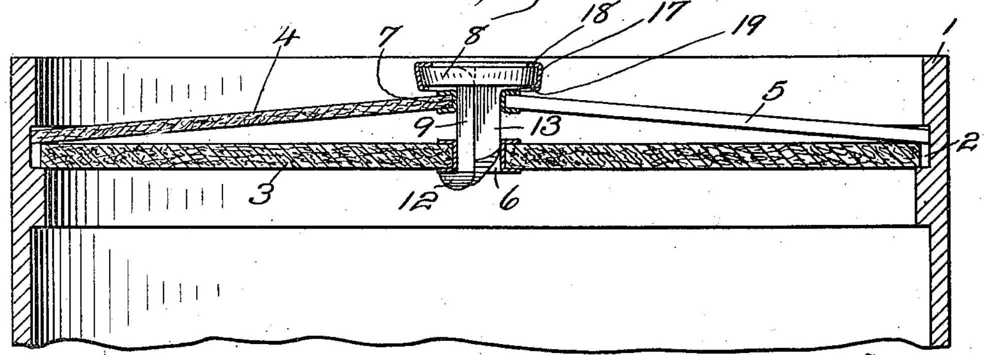

Figure 1 is a top plan view of a barrel head secured and sealed in position with our improved barrel head seal, Fig. 2 is a transverse section through the barrel head and barrel, with the main seal member inserted through the barrel head members, Fig. 3 is a similar view with the main and auxiliary seal members in operative position, the barrel head expanded, and the sealing ring placed in position to be clamped around the body or main portions of the main and auxiliary seal members, Fig. 4 is a view similar to Fig. 3 with the sealing ring clamped in position, Fig. 5 is a transverse section through the seal, with the sealing ring in position and clamped, Fig. 6 is a detail top plan view of the main seal member, Fig. 7 is a detail bottom plan view of the same, Fig. 8 is a detail top plan view of the auxiliary seal member, and Fig. 9 is a detail bottom plan view of the same.

Referring more particularly to the drawings, in which similar reference characters designate corresponding parts throughout the several views, 1 designates a portion of a barrel or other receptacle, within the croze 2 of which is positioned the inner head member 3, which is preferably flat and solid and may be formed of any suitable material but preferably of compressed pulp, fiber or the like, and upon which rests the edge of the outer barrel head member 4, usually of the same material, which is preferably of concavo-convex form and provided with a radial slit 5 extending from the edge of the outer head member 4 to the central opening 7 which is suitably reinforced, as will be readily understood by referring to Figs. 2, 3 and 4 of the drawings. It will also be understood that the reinforced central opening 7 is directly above the reinforced central opening 6 of the inner head member 3. This construction of the head is clearly and fully described in and covered by our co-pending application, Serial No. 24,077, and does not form a part of the subject matter of this application, but is shown and briefly described in this application so that this form of barrel head seal may be illustrated and described as applied to this type of barrel head.

In the present form of barrel head seal, the body or main or horizontal portion 8 of the main seal member has its outer edge beveled downwardly and inwardly, the purpose of which will presently appear, and has a shank 9 extended from the same and bent downwardly from about the center of said body or main horizontal portion 8, the sides of the shank 9 being cut away from the body 8 by cutting the latter inwardly from one edge along the sides of said shank 9, as will be readily understood by referring to Fig. 6, thereby providing the opposite spaced portions 10 of said body which in turn have their inner straight edges beveled inwardly and downwardly to form the seats 11, the purpose of which will also presently appear.

The shank 9 has its lower end enlarged and bent at a right angle to form the hook 12 for engagement with the lower face or inner face of the inner head member 3 to one side of the reinforced central opening 6 thereof, after the main seal member has been placed in position and the shank 9 thereof inserted through the openings 7 and 6 of said head members 4 and 3 respectively and the main seal member moved to one side of said openings 7 and 6, it being understood that when forcing the shank 9 through the opening 6 by pressing downwardly upon the body 8 of the main seal member, the central portion of the outer head member 4 is pressed toward the central portion of the head member 3 and the barrel head thereby expanded and tightened in the croze 2, the slit 5 permitting the proper horizontal expansion of the head member 4 as well as the proper radial expansion of the same.

After the main seal member has been forced to operative position, as shown in Figs. 3 and 4 in the drawings, the auxiliary seal member is inserted by way of the space between the portions 10 of the body 8 of the main seal member, the depending portion 13 of the auxiliary seal member entering the central openings 7 and 6 rearwardly of the shank 9 and preventing movement of the latter, while the head or horizontal portion 14 of said auxiliary seal member rests between the portions 10 of the head 8 of said main seal member, said body or horizontal portion 14 having its opposite side faces 15 beveled to rest upon the seats 11, previously mentioned, thereby limiting downward movement of the auxiliary seal member. The outer face 16 is rounded and beveled inwardly and downwardly to form a continuation of the outer edge of the body 8 of the main seal member, so that the sealing ring 17 may be placed in position and clamped, as will now be described.

After the auxiliary seal member has been placed in position, the sealing ring 17, previously mentioned, which has an inturned upper flange 18 is placed in position over the bodies 8 and 14 of the main and auxiliary seal members, and by use of a suitable tool (not shown), the sealing ring 17 is clamped tightly around the inwardly and downwardly beveled edges of the said heads 8 and 14, and under the same, as clearly shown in Figs. 4 and 5, forming a lower inturned flange 19 which prevents removal of the sealing ring 17, after the same has once been clamped in position, without injuring or destroying the sealing ring 17. It will therefore be seen that after a barrel head or the like has been secured and sealed in position, with the form of barrel head seal disclosed in this application, it will be impossible for unauthorized parties to remove the head without first destroying the sealing ring 17 and thereby leaving evidence of their act.

While the preferred embodiment of the invention has been shown and illustrated, it will be understood that minor changes in the details of construction and arrangement of parts may be resorted to within the scope of the appended claims without departing from the spirit of the invention or sacrificing any of the advantages of the same.

What is claimed is:—

1. A barrel head seal comprising main and auxiliary seal members having body portions provided with beveled edges, and a sealing ring engaged around said body portions and inclosing said beveled edges.

2. A barrel head seal comprising a main seal member including a shank and a body, said body having its edge beveled inwardly and downwardly, an auxiliary seal member including a shank and a body, the first mentioned body having an opening formed therein, the second mentioned body resting in said opening and having its outer edge beveled inwardly and downwardly and forming a continuation of the beveled edge of the first mentioned body, and a sealing ring engaged around said beveled edges of said bodies and extending over and under the latter.

3. A barrel head seal comprising a main seal member adapted to be pressed upon for expanding and securing a barrel head in position within a receptacle, an auxiliary seal member coöperating with said main seal member, and a sealing ring inclosing portions of said main seal member and said auxiliary seal member and preventing independent movement of the same.

4. A barrel head seal comprising a main seal member and an auxiliary seal member removably engaged in a barrel head, pressure on main seal being adapted to expand and secure the head in position, said main and auxiliary seal members having beveled portions outwardly of the barrel head, and a sealing ring clamped around said beveled portions to prevent independent movement or withdrawal of said main and auxiliary seal members from said head.

5. A barrel head seal comprising a main seal member and an auxiliary seal member, said main seal member having a head provided with a beveled outer edge, said main seal member including a depending shank, the auxiliary seal member including a head engaged in the head of the main seal member and provided with an outer beveled edge forming a continuation of the beveled outer edge of the main seal member head, and a sealing member engaged against the beveled edges of the heads of the main and auxiliary seal members and extending above and beneath said heads, said auxiliary seal member also including a depending portion for coöperation with the depending shank of the main seal member.

6. A barrel head seal comprising a main seal member including a circular head having a beveled outer edge and provided with an opening at one side, an auxiliary seal member including a head engaged in the opening of the first mentioned head and provided with a beveled outer edge, and a sealing ring clamped upon the beveled outer edges of said heads to lock together said main and auxiliary seal members.

7. A barrel head seal including a main seal member and an auxiliary seal member having depending portions for engagement through said head, pressure on said main seal member adapting it to expand and secure the head in position within the receptacle; said main and auxiliary seal members having outer flat portions engaged one in the other and provided with an outer circular beveled edge, and a sealing ring clamped around said outer circular beveled edge and bent over and under said outer flat portions to lock together and prevent withdrawal of said main and auxiliary seal members and thereby seal the receptacle head in position.

In testimony whereof we affix our signatures.

ARTHUR J. HODGE.
HENRY B. RUGGLES.

Copies of this patent may be obtained for five cents each, by addressing the "Commissioner of Patents, Washington, D. C."